Patented Dec. 15, 1953

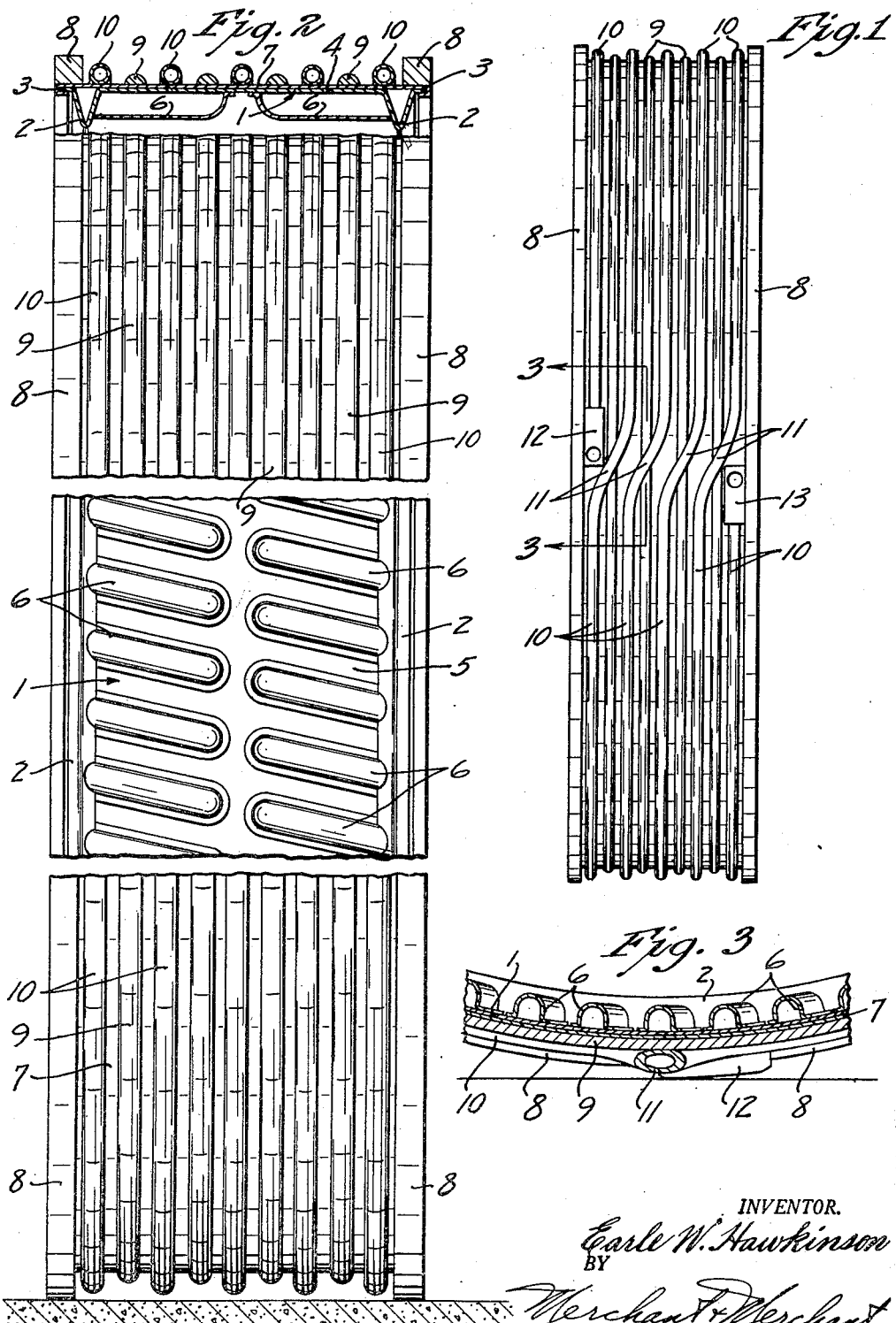

2,662,245

UNITED STATES PATENT OFFICE 2,662,245

RETREAD MOLD CONSTRUCTION

Earle W. Hawkinson, Minneapolis, Minn., assignor to Paul E. Hawkinson Company, Minneapolis, Minn., a corporation of Minnesota Application September 20, 1952, Serial No. 310,615

3 Claims. (Cl. 18—18)

My invention relates to tire retreading molds or matrices and is in the nature of an improvement upon the structures disclosed in Patents 1,917,262 and 2,339,696. In such retreading molds, known to the industry as "Hawkinson Curing Rings," heat is imparted to the endless cylinder-like sheet metal matrix through the medium of a tubular coil wound generally spirally about the outer peripheral surface thereof. To impart rigidity and permanency to such sheet metal molds, it has been found necessary to reinforce same in various manners, as suggested by Patent 2,331,680. However, such reinforcing, together with the solder required to rigidly secure the heating coils to the matrix, imparts such weight to the molds that it is frequently necessary to roll them upon the ground in transporting them to and from the spreader mounted tire in carrying out the process of Patent 1,917,262 (Re: 21,956). Particularly in the case of the large matrices, the weight becomes so great that the tubular heating coils are smashed, dented or loosened by contact with the ground or floor, as the case may be. The primary object of my invention is the provision of a mold of the type above described which is reinforced and constructed in such a manner that tubular heating coils do not come into contact with the floor as the matrix is rolled from place to place.

A still further object of my invention is the provision of a mold of the type immediately above described which has no greater weight than is absolutely necessary to accomplish the broad objective of protection throughout the circumference of the matrix of the tubular heating coil.

A still further object of my invention is the provision of a retreading matrix of the type above described which is relatively inexpensive to produce, is not unsightly in appearance and facilitates the handling of the matrices.

The above and still further objects of my invention will become apparent from the following detailed specification, appended claims and attached drawings.

Referring with greater particularity to the drawings wherein like characters indicate like parts throughout the several views:

Fig. 1 is a plan view of a retreading matrix built in accordance with my invention;

Fig. 2 is an enlarged view corresponding to Fig. 1, some parts being broken away and other parts being shown in section; and Fig. 3 is an enlarged fragmentary view in section taken on the line 3—3 of Fig. 1.

Referring with greater particularity to the drawings, the numeral 1 indicates an endless cylinder-like sheet metal matrix having radially inwardly projecting, integrally-formed, endless confining flanges 2 adjacent its opposite side edges 3. It will be noted that confining flanges 2 are generally V-shape in cross-section and that the opposite side edge portions 3 lie in the same plane as the cylinder-like central portion 4 intermediate the flanges 2. The inner-peripheral surface 5 of the matrix 1 has secured thereto in any desired manner a plurality of design forming cups 6, as shown in Patent 2,457,370. Also a reinforcing jacket 7 is shown as secured to the outer peripheral surface of the matrix 1, as more clearly shown in Patent 2,339,696.

Secured to the reinforcing jacket 7 adjacent the opposite side edges of the matrix 1 are endless radially outwardly projecting rail elements 8, shown as being rectangular in cross-section. Elements 8 also act as reinforcing elements and prevent denting of the side edges of the matrix 1. To impart rigidity to the mold intermediate the rail elements 8, I provide a plurality of reinforcing bands 9 which are laterally spaced from the rails 8 and from each other, as shown in Fig. 2. It will be noted that the reinforcing bands 9 are of less height than the rails 8. Also secured to the outer peripheral surface of the jacketed matrix 1, by solder or the like, is an endless tubular heating element 10 which is coiled generally spirally thereabout intermediate the rail elements 8. It will be noted that the heating elements 10 are of also less height than the rail elements 8.

Preferably, and as shown, substantially each convolution of the heating coil 10 lies in a space between a rail 8 and a reinforcing band 9 or in the space between two of said reinforcing bands 9. As shown in Fig. 1, the coiled heating element 10 crosses over its adjacent reinforcing band 9 at substantially the same point circumferentially of the mold, as indicated at 11. The opposite ends of the coil 10 terminate in enlarged inlet and outlet heads 12 and 13 respectively on opposite sides of the matrix 1 and at opposite sides of the point of cross-over of the coils 10 with the reinforcing bands 9. In view of the fact that the combined height of the reinforcing bands 9 and the tubular heating elements 10 is greater than the radial height of the rail elements 8, the heating coils 10 project radially outwardly a greater height than said rail elements 8 at their point of cross-over of the bands 9. Because of this, it has been found that the heating elements 10 become dented or squashed at this point of cross-over.

Of course, this could be avoided by making the rails 8 a greater radial height throughout their circumference. But, this is objectionable because the additional weight imparted to the matrix 1 unnecessarily decreases the ease of handling same. To overcome this inexpensively and without adding any material weight thereto, I provide inlet and outlet heads of a height greater than the combined height of said bands 9 and heating elements 10 (see Fig. 3) and so position said inlet and outlet heads 12 and 13 that they will protect the coils 10 at the point of cross-over 11. As shown in Fig. 1, this is accomplished by placing one head on one side and one on the opposite side of the point of cross-over of said coils 10 with said bands 9. Or in other words, circumferentially staggering said inlet and outlet heads 12 and 13 respectively with respect to said points of cross-over 11.

In this manner and at a minimum of weight and with a maximum of strength, the heating elements 10 are spaced from the floor during rotation, as shown in Fig. 2, for all but the point of cross-over 11. At said point 11 the circumferentially staggered inlet and outlet heads 12 and 13 respectively elevate the mold above the heating elements 10.

While I have disclosed a commercial embodiment of my invention, it is obvious that same is capable of modification without departure from the spirit of the invention as set forth in the appended claims.

What I claim is:

1. A tire retreading device comprising an endless cylinder-like matrix formed from sheet metal and having radially inwardly projecting endless tread material confining flanges adjacent its opposite side edges, an endless reinforcing band tightly encompassing the outer peripheral surface of said matrix intermediate its side edges, an endless tubular heating element coiled about the outer peripheral surface of said matrix intermediate said side edges, said heating coil crossing over said reinforcing band, and a radially outwardly projecting endless rail element rigidly secured to said outer peripheral surface of said matrix one each adjacent its opposite side edges, said rail elements having radial heights greater than either the tubular heating element or the reinforcing band but less than the combined height thereof, said tubular heating coil terminating in inlet and outlet heads having radial heights greater than the combined heights of said heating element and said reinforcing band and said heads being situated circumferentially of the mold sufficiently close to the point of cross-over of said heating element with said reinforcing band as to afford protection to said heating coil when the matrix is rolled upon the ground past said point of cross-over.

2. A tire retreading device comprising an endless cylinder-like matrix formed from sheet metal and having integrally formed radially inwardly projecting endless tread material confining flanges adjacent its opposite side edges, a plurality of reinforcing bands tightly encompassing the outer peripheral surface of said matrix, said bands being laterally-spaced with respect to the side edges of said matrix and with respect to each other, an endless tubular heating element coiled about said matrix between the side edges thereof, each convolution of said heating coil extending substantially around said matrix in one of said spaces and crossing over an adjacent reinforcing band at substantially the same point circumferentially of the mold, and a radially outwardly projecting endless rail element rigidly secured to the outer peripheral surface of said matrix one each adjacent an opposite side edge, said rail elements having radial heights greater than either the tubular heating element or the reinforcing bands but less height than the combined height of said tubular heating element and one of said reinforcing bands, said tubular heating coil terminating in inlet and outlet heads having radial heights greater than the combined heights of said heating element and said one of said reinforcing bands and being situated circumferentially of the mold at substantially the point of common cross-over of said heating coil with said reinforcing bands whereby to afford protection to said heating cils as said matrix is rolled upon the ground past said point of cross-over.

3. The structure defined in claim 2 in which said inlet and outlet heads are circumferentially staggered with respect to the points of cross-over of said heating elements with said reinforcing bands.

EARLE W. HAWKINSON.

References Cited in the file of this patent

UNITED STATES PATENTS

| Number | Name | Date |
|---|---|---|
| 2,041,321 | Brasty | May 19, 1936 |
| 2,155,906 | Rihn et al. | Apr. 25, 1939 |

FOREIGN PATENTS

| Number | Country | Date |
|---|---|---|
| 427,284 | Great Britain | Apr. 18, 1935 |